United States Patent [19]

Ley et al.

[11] 4,104,195

[45] Aug. 1, 1978

[54] BLOWING AGENTS BASED ON UREA DICARBOXYLIC ACID ANHYDRIDE

[75] Inventors: Kurt Ley, Odenthal-Gloebusch; Hermann Hagemann, Cologne; Helmut Hurnik, Opladen, Germany

[73] Assignee: Bayer Aktiengesellschaft, Leverkusen, Germany

[21] Appl. No.: 616,523

[22] Filed: Sep. 25, 1975

[30] Foreign Application Priority Data

Nov. 7, 1974 [DE] Fed. Rep. of Germany ....... 2452740

[51] Int. Cl.$^2$ ............................ C09K 3/00; C08J 9/08
[52] U.S. Cl. .............................. 252/350; 264/DIG. 5; 521/89; 521/90
[58] Field of Search ................ 252/350; 260/2.5 AE; 264/DIG. 5

[56] References Cited

U.S. PATENT DOCUMENTS

| 2,832,744 | 4/1958 | Soule et al. ...................... 252/350 X |
| 3,177,164 | 4/1965 | Mills et al. ...................... 260/2.5 HA |
| 3,743,605 | 7/1973 | LaClair ................................ 252/350 |

OTHER PUBLICATIONS

Monatshefte der Chemie, vol. 97, pp. 361–367 (1965).

Primary Examiner—Richard D. Lovering
Attorney, Agent, or Firm—Burgess, Dinklage & Sprung

[57] ABSTRACT

Blowing agents comprising urea dicarboxylic acid anhydride do not give rise to discoloring decomposition residues nor form acid or alkaline by-products. These blowing agents may be used for expanding thermoplastic resins.

2 Claims, No Drawings

BLOWING AGENTS BASED ON UREA DICARBOXYLIC ACID ANHYDRIDE

This invention relates to blowing agents based on urea dicarboxylic acid anhydride which may also be used in combination with water-eliminating agents for the production of cellular and porous articles, particularly foams, of thermoplastic plastics.

It is known that foams of thermoplastic plastics can be produced by working an organic blowing agent into the plastic or by applying a blowing agent to a plastics granulate by drum-mixing or by homogeneously mixing a blowing agent with a plastics powder which decomposes with evolution of gas at temperatures at which the plastics material becomes plastic. Substances belonging to various classes of compounds have been described for this purpose in the literature, for example carbonates and bicarbonates, nitriles, hydrides, peroxides, derivatives of oxalic acid, urea and related compounds, azo compounds, hydrazines, semicarbazides, azides, N-nitroso compounds, triazoles, etc. (cf. Kunststoffe 62 (1972), No. 10, pages 687 – 689).

Unfortunately, the substances belonging to these classes of compounds have certain deficiencies which restrict their suitability for use as blowing agents. For example, cleavage products with an acid or alkaline character or with a toxic effect can be generated by the blowing agents. The decomposition residues furthermore can have a discoloring effect which is a disadvantage for numerous purposes. In cases where azodicarbonamide, the most frequently used blowing agent in practice, is used, ammonia is released with the decompositon gases which can give rise to corrosion in the metal molds used for foam production. In addition, a troublesome mold coating may be observed for example in the injection molding of thermoplasts containing blowing agents attributable to the decomposition residues formed.

Another important distinguishing feature is the decomposition temperature of the various blowing agents at which the blowing gas required for the foaming process is liberated. The decomposition point may be below or above the decomposition point determined on the pure blowing agent due to the plastics material itself or to other substances added to the plastics material.

The object of the invention is to provide a blowing agent which, during decomposition, does not give off any corrosive, discoloring, unpleasant smelling or toxic decomposition products and which is suitable for the production of foamed thermoplasts which are processed at temperatures in the range from 150° C to 350° C.

Accordingly, the invention provides a blowing agent consisting of urea dicarboxylic acid anhydride, optionally in combination with water-eliminating compounds and/or known blowing agents and/or compounds which reduce the decomposition temperature of the blowing agent or accelerate decomosition (kickers).

Urea dicarboxylic acid anhydride is characterized by the following formula:

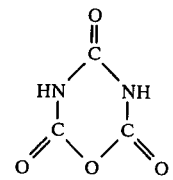

The compound can be obtained by a process described in Monatshefte der Chemie, Vol 97, page 342 (1965).

Suitable water-eliminating compounds are for example salts containing water of crystallization such as: sodium metaborate, sodium tetraborate, sodium citrate, sodium orthophosphate, tert.-sodium metasilicate, sodium sulphate (Glauber's salt), sodium tartrate, sodium potassium tartrate, sodium metaborate $x$ $H_2O_2$, magnesium metaborate, basic magnesium carbonate, magnesium orthophosphate, sec-magnesium orthophosphate, tert-magnesium sulphate, magnesium tartrate, calcium benzoate, calcium metaborate, calcium citrate, calcium lactate, calcium sulphate (natural gypsum), calcium tartrate, zinc sulphate, zinc orthophosphate, tert-aluminum sulphate, Al-K-sulphate, Al-Na-sulphate and aluminum sulphate. However, carboxylic acids or their derivatives such as ammonium salts or amides may also be used as the water-eliminating compounds. The following carboxylic acids and carboxylic acid derivatives are mentioned by way of example; terephthalic acid, phthalic acid, phthalic acid amide, ammonium phthalate, benzoic acid, benzoic acid amide, ammonium benzoate, succinic acid, succinic acid amide and ammonium succinate.

The anhydride formed by the elimination of water from carboxylic acids affords a further advantage. The undesirable ammonia formed during thermolysis in the case of some blowing agents or blowing agent mixtures is irreversibly chemically bound by reaction (for example phthalic acid anhydride to phthalic acid imide). Since water is formed during phthalimide formation from phthalic acid anhydride and ammonia or an amine, it is also possible to use phthalic acid anhydride for example instead of phthalic acid, in the case of a decomposition product yielding ammonia or an amine.

Already known blowing agents are, for example, sulpho and disulpho hydrazides, such as diphenyl sulphone-3,3'-disulphohydrazide or 4,4'-hydroxy-bis-(benzenesulphohydrazide), azodicarbonamide, optionally in conjunction with known, standard kickers, preferably based on Zn, Cd or Pb compounds, such as zinc oxide, zinc stearate, zinc laurate, cadmium stearate, cadmium laurate, lead stearate, dibasic lead phthalate, dibasic lead phosphite; 5-morpholyl-1,2,3,4-thiatriazole; trihydrazinotriazine; benzazimide; bis-benzazimide; isatoic acid anhydride and sodium bicarbonate.

The individual components of the blowing agent mixture may be mixed in any quantitative ratios. However, the blowing agent consists preferably of from 10 to 100% by weight and most preferably from 35 to 80% by weight of urea dicarboxylic acid anhydride, from 0 to 90% by weight and most preferably from 20 to 65% by weight of water-eliminating compound and from 0 to 90% by weight and preferably from 0 to 45% by weight of a known blowing agent.

The following table shows the gas yields of the urea dicarboxylic acid anhydride (hereinafter designated A) with various additives:
gas elimination with pneumatic tank, heating rate approximately 1.3° C/min
heating threshold of sample : 100° C
weighed portion : 1 g of A + x g of additives

| No. | Blowing agent mixture: 1g of A + x g of additives | Effective gas elimination ml | at max temp. (° C) | Δml of gas in relation to A without any additives | Δ% of gas in relation to A without any additives |
|---|---|---|---|---|---|
| 1. | no additives | 164 | 200 | ± 0 | ± 0 |
| 2. | 0.1 g $MgSO_4 \cdot 7H_2O$ | 203 | 200 | + 39 | + 23.8 |
| 3. | 0.2 g $MgSO_4 \cdot 7H_2O$ | 210 | 185 | + 46 | + 28.0 |
| 4. | 0.316 g $MgSO_4 \cdot 7H_2O$ | 230 | 173 | + 66 | + 40.2 |
| 5. | 0.2 g $ZnSO_4 \cdot 7H_2O$ | 219 | 180 | + 55 | + 33.5 |
| 6. | 0.289 g $Na_2B_4O_7 \cdot 10H_2O$ | 209 | 180 | + 45 | + 27.4 |
| 7. | 0.5 g Na-citrate $5\tfrac{1}{2}H_2O$ | 228 | 147 | + 64 | + 39.0 |
| 8. | 0.72 g $4MgCo_3 \cdot Mg(OH)_2 \cdot 4H_2O$ | 194 | 180 | + 30 | + 18.3 |
| 9. | 0.33 g $SiO_2$ (Aerosil) | 170 | 200 | + 6 | + 3.6 |
| 10. | 0.33 g ZnO | 177 | 190 | + 13 | + 7.9 |
| 11. | 0.33 g MgO | 183 | 200 | + 19 | + 11.6 |
| 12. | 1 g diphenyl sulphone-3,3'-disulphohydrazide | 110 | 157 | Comparison | |
| 13. | 1 g 4,4'-hydroxy-bis-(benzenesulphohydrazide) | 124 | 165 | | |
| 14. | 0.5 A 0.5 of 12. | 207 | 154 | +70[x) | + 51.1 |
| 15. | 0.5 A 0.46 of 13. | 180 | 160 | +41[x) | + 29.5 |
| 16. | 0.248 g $Na_2SO_4 \cdot 10H_2O$ | 227 | 180 | 63 | 38.41 |
| 17. | 0.66 g $CaSO_4 \cdot 2H_2O$ | 229 | 185 | 65 | 39.63 |
| 18. | 0.285 g $Al_2(SO_4)_3 \cdot 18 H_2O$ | 215 | 180 | 51 | 31.09 |
| 19. | 0.296 g $NaBO_2 \cdot H_2O_2 \cdot 3H_2O$ | 211 | 180 | 47 | 28.65 |
| 20. | 0.244 g $Na_3PO_4 \cdot 12H_2O$ | 196 | 190 | 32 | 19.51 |
| 21. | 1.278 phthalic acid | 278 | 180 | 109 | 66.4 |

[x)Δml of gas in relation to the theoretical gas yield of the mixture.
theoretical ml of gas for 14. = 137 ml 15. = 139 ml The table shows the favorable gas yield of the urea dicarboxylic acid anhydride and the increasing effect of the additives.

By means of the blowing agent according to the invention, it is possible to produce cellular and porous articles of thermoplastic plastics, more especially foams thereof.

Examples of thermoplastic plastics are polystyrene, polyethyl styrene, polyamide, polycarbonate, polysulphone, polyethylene terephthalate, polybutylene terephthalate, polyphenylene oxide, polymethacrylate, polymethacrylonitrile, polyacrylonitrile, polyethylene, polyvinyl chloride, plastics based on cellulose esters, copolymers of the above-mentioned components, acrylonitrile-butadiene-styrene polymers (ABS), mixtures of polysulphone and styrene-acrylonitrile or ABS polymers, mixtures of polycarbonate and ABS polymers, mixtures of polyvinyl chloride and ABS polymers or styrene-acrylonitrile.

The blowing agent according to the invention is preferably added in quantities of from 0.01 to 30% by weight and, with particular preference, in quantities of from 0.1 to 10% by weight, based on the plastics material. However, it may also be added in any other quantity familiar to the expert. The particular quantity added is governed by the requirements imposed by the expert on the article to be foamed.

The plastics/blowing agent mixture may be produced by various methods, all of which are based on mixing.

Thus, the mixture may be prepared for example in a tumble mixer. In this case, the adhesion promoter, for example butyl stearate, is homogeneously applied to the plastics granulate by drum-mixing. The blowing agent is then added. After further mixing the blowing agent is uniformly distributed over the surface of the plastics material.

Another possible method is thoroughly to mix the powder-form blowing agent with the powder-form plastics material in a slowly rotating mixing vessel.

In addition, it is possible to prepare from the blowing agent and a thermoplast softening or melting below the decomposition temperature of the blowing agent (for example ethylene/vinyl acetate) a blowing agent concentrate (processing machines: rolls, kneaders, extruders), which is subsequently added to the plastics material to be foamed.

Another possible method of preparing the plastics/blowing agent mixture is directly to introduce the powder-form blowing agent into the hopper of the extruder or injecton molding machine where it is applied to the surface of the thermoplast in the same way as in the dry coloring of plastics.

The blowing agent according to the invention may also be used in combination wth known additives, such as nucleating agents or seed formers (for example talcum, $MgCO_3$, $CaCO_3$, $ZnCO_3$, $CaSO_4$, $NaHCO_3$, polytetrafluoroethylene powder, polyhexafluoropropylene powder), fillers (for example glass fibers, $CaCO_3$, $MgCO_3$, chalk, kaolin, $TiO_2$), lubricants (for example, waxes, paraffins, fatty acid esters), stabilizers (for example UV-absorbers, light and heat stabilizers), adhesion promotors (for example paraffin oil, plasticizers, butyl stearate, resin solutions), supporting materials (for example $SiO_2$, MgO, ZnO, $ZnCO_3$), peroxides, pigments, dyes, antioxidants and/or antiozonants. These additives may be added either to the blowing agent or to the plastics mixture.

To produce the cellular and porous articles, the blowing agent/plastics mixtures are heated to temperatures of from 150° to 350° C and preferably to temperatures of from 160° to 300° C, the decomposition of the blowing agent causing the plastics material to foam. The particular temperature applied is governed by the processing range of the particular thermoplast used.

The following are mentioned as examples of cellular and porous articles; foamed housings for the radio and phonograph industry, such as radio and television housings, tape cassettes, base plates, front screens and rear walls, chassis for record players, loud speaker boxes; foam furniture and furniture components of all kinds, such as childrens' stools, cupboards, office furniture, shelving; foamed cutlery handles, picture frames, wood imitations of all kinds, switch cabinets, housings; sports articles, table tennis bats, beach ball bats, water skis, ski cores; extruded articles, foamed profiles of all kinds, tubes, synthetic wood.

The invention is illustrated by the following Examples:

EXAMPLE 1

A mixture of 1000 parts by weight of polystyrene and 2 parts by weight of butyl stearate was mixed for 15 minutes in a tumble mixer. Thereafter 5 parts by weight of urea dicarboxylic acid anhydride were added and homogeneously distributed by continued mixing. The mixture was then foamed in a screw injecton molding machine at temperatures in the range from 220° to 240° C to form 9 mm thick moldings. A fine-pored foam with a regular foam structure and a density of 0.58 g/cc was obtained.

EXAMPLE 2

A mixture of 1000 parts by weight of ABS polymer and 5 parts by weight of butyl stearate as adhesion promoter was prepared by mixing for 15 minutes in a tumble mixer. Thereafter 5 parts by weight of urea dicarboxylic acid anhydride and 2 parts by weight of $MgSO_4 \cdot 7H_2O$ were added and homogeneously distributed over the ABS surface by continued mixing. The mixture thus prepared was subsequently foamed in a screw injecton molding machine at a temperature of 240° C to form 9 mm thick moldings. A fine-pored foam with a regular foam structure and a density of 0.60 g/cc was obtained.

EXAMPLE 3

As in Example 2, polyamide was foamed by 5 parts by weight of urea dicarboxylic acid anhydride and 1 part by weight of zinc oxide as support. A fine-pored foam with a density of 0.58 g/cc was obtained.

We claim:

1. A blowing agent composition comprising 10 to 80% by weight of urea dicarboxylic acid anhydride, 0–90% by weight of at least one water-eliminating compound and the balance, if any, being at least one known blowing agent, said blowing agent composition decomposing without giving off any corrosive, discoloring, unpleasant smelling or toxic decomposition products.

2. A blowing agent composition according to claim 1 comprising 35 to 80% by weight of urea dicarboxylic acid anhydride, 20 to 65% by weight of at least one water-eliminating compound and 0 to 45% by weight of at least one known blowing agent.

* * * * *